United States Patent
Allen et al.

(10) Patent No.: US 8,789,969 B2
(45) Date of Patent: Jul. 29, 2014

(54) COMPACT LED LIGHT ENGINE WITH REFLECTOR CUPS AND HIGHLY DIRECTIONAL LAMPS USING SAME

(75) Inventors: Gary R. Allen, Chesterland, OH (US); Mark E. Kaminski, Beachwood, OH (US)

(73) Assignee: GE Lighting Solutions, LLC, Cleveland, OH (US)

( * ) Notice: Subject to any disclaimer, the term of this patent is extended or adjusted under 35 U.S.C. 154(b) by 346 days.

(21) Appl. No.: 12/981,846

(22) Filed: Dec. 30, 2010

(65) Prior Publication Data
US 2012/0044682 A1    Feb. 23, 2012

Related U.S. Application Data

(60) Provisional application No. 61/374,431, filed on Aug. 17, 2010.

(51) Int. Cl.
*F21V 7/00* (2006.01)

(52) U.S. Cl.
USPC ............................ 362/241; 362/341; 362/347

(58) Field of Classification Search
USPC ......... 362/235, 240, 241, 243, 244, 245, 341, 362/347, 350
See application file for complete search history.

(56) References Cited

U.S. PATENT DOCUMENTS

| | | | | |
|---|---|---|---|---|
| 5,580,156 A * | 12/1996 | Suzuki et al. | | 362/184 |
| 6,367,949 B1 * | 4/2002 | Pederson | | 362/240 |
| 6,641,284 B2 * | 11/2003 | Stopa et al. | | 362/240 |
| 6,840,654 B2 * | 1/2005 | Guerrieri et al. | | 362/241 |
| 7,281,818 B2 * | 10/2007 | You et al. | | 362/241 |
| 7,629,570 B2 * | 12/2009 | Mondloch et al. | | 250/227.11 |
| 7,637,628 B2 * | 12/2009 | Budike | | 362/247 |
| 7,914,162 B1 * | 3/2011 | Huang | | 362/92 |
| 7,993,032 B2 * | 8/2011 | Budike | | 362/294 |
| 7,993,033 B2 * | 8/2011 | Moriyama et al. | | 362/296.01 |
| 2002/0093820 A1 * | 7/2002 | Pederson | | 362/241 |
| 2006/0193139 A1 | 8/2006 | Sun | | |
| 2007/0121328 A1 | 5/2007 | Mondloch | | |

FOREIGN PATENT DOCUMENTS

| | | |
|---|---|---|
| CN | 2489181 Y | 5/2002 |
| EP | 2199658 A1 | 6/2010 |

OTHER PUBLICATIONS

PCT Search Report issued in connection with corresponding WO Patent Application No. US11/39392 filed on Jun. 7, 2011.

* cited by examiner

*Primary Examiner* — John A Ward
(74) *Attorney, Agent, or Firm* — Fay Sharpe LLP

(57) ABSTRACT

A light engine comprises a plurality of light emitting diode (LED) devices arranged in a plane and a corresponding plurality of reflector cups wherein each LED device is disposed in a corresponding reflector cup and wherein the light engine does not include either a diffuser or a light mixing cavity. A directional lamp comprises the aforesaid light engine and an imaging lens arranged to generate an image of the light engine at about infinity. The directional lamp may further include a collecting reflector (for example, a conical, parabolic, or compound parabolic reflector) extending between a relatively narrower entrance aperture at which the light engine is disposed and a relatively wider exit aperture at which the imaging lens is disposed. The imaging lens may be arranged to generate a defocused image of the light engine at about infinity to soften the beam edge.

24 Claims, 10 Drawing Sheets

COMPACT LED LIGHT ENGINE WITH REFLECTOR CUPS AND HIGHLY DIRECTIONAL LAMPS USING SAME

This application claims the benefit of U.S. Provisional Application No. 61/374,431 filed Aug. 17, 2010. U.S. Provisional Application No. 61/374,431 filed Aug. 17, 2010 is incorporated herein by reference in its entirety.

BACKGROUND

The following relates to the illumination arts, lighting arts, solid state lighting arts, and related arts.

A directional lamp is defined by the US Department of Energy in its Energy Star Eligibility Criteria for Integral LED Lamps, draft 3, as a lamp having at least 80% of its light output within a cone angle of 120 degrees (full-width at half-maximum of intensity, FWHM). Directional lamps include "flood" lamps having relatively broad beam patterns, and "spot" lamps having substantially narrower beam patterns (e.g., having a beam intensity distribution characterized by a FWHM<20°, with some lamp standards specified for angles as small as 6-10° FWHM).

BRIEF SUMMARY

In some embodiments disclosed herein as illustrative examples, a directional lamp comprises: a light engine comprising a plurality of light emitting diode (LED) devices and a corresponding plurality of reflector cups wherein each LED device is disposed in a corresponding reflector cup; and an imaging lens arranged to generate an image of the light engine at about infinity. The directional lamp may further include a collecting reflector (for example, a conical, parabolic, or compound parabolic reflector) defining sidewalls of the directional lamp extending between a periphery of the light engine and a periphery of the optically active area of the imaging lens, the collecting reflector having an entrance aperture at which the light engine is disposed and an exit aperture at which the imaging lens is disposed, wherein some light rays emanating directly from the LED devices reflect off the collecting reflector into the imaging lens and some light rays emanating directly from the LED devices reflect off the reflecting cups into the imaging lens and some light rays emanating from the LED devices go directly into the imaging lens without any reflections. The imaging lens may be arranged to generate a defocused image of the light engine at about infinity to soften the beam edge.

In some embodiments disclosed herein as illustrative examples, a light engine comprises a plurality of light emitting diode (LED) devices arranged in a plane and a corresponding plurality of reflector cups wherein each LED device is disposed in a corresponding reflector cup and wherein the light engine does not include either a diffuser or a light mixing cavity. The reflector cups may be sufficiently shallow that some light emitted by the LED devices at an angle of greater than 40° to the optical axis of the light engine does not impinge on the reflector cups. The reflector cups may be sufficiently shallow that some light emitted by the LED devices at an angle of greater than 55° to the optical axis of the light engine does not impinge on the reflector cups.

In some embodiments disclosed herein as illustrative examples, a directional lamp comprises: a light engine including a plurality of light emitting diode (LED) devices arranged in a plane and a corresponding plurality of reflector cups wherein each LED device is disposed in a corresponding reflector cup and wherein the light engine does not include either a diffuser or a light mixing cavity; and an imaging lens arranged to generate an image of the light engine at about infinity. The directional lamp may further include a collecting reflector (for example, a conical, parabolic, or compound parabolic reflector) extending between a relatively narrower entrance aperture at which the light engine is disposed and a relatively wider exit aperture at which the imaging lens is disposed. The imaging lens may be arranged to generate a defocused image of the light engine at about infinity to soften the beam edge.

DETAILED DESCRIPTION OF PREFERRED EMBODIMENTS

Figure 1:
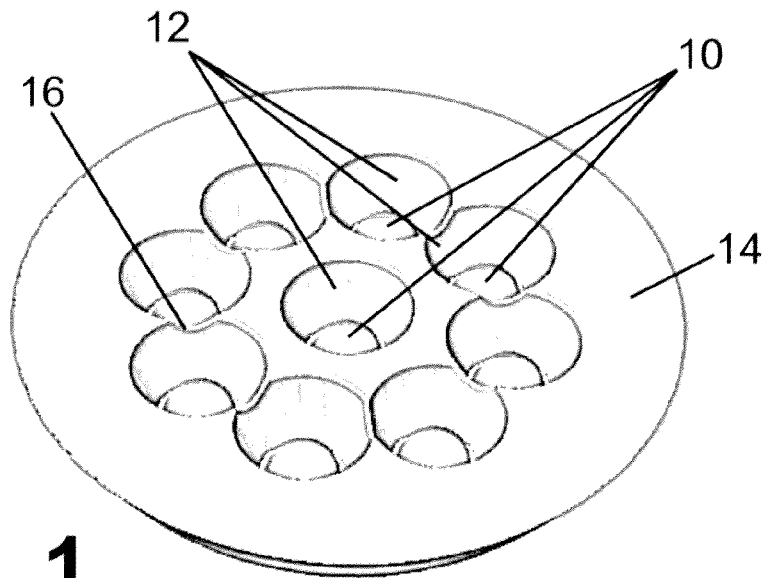
FIG. 1 shows a perspective view of a engine including nine light emitting diode (LED) devices arranged in reflector cups.

The performance of a directional lamp can be quantified by several characteristics that are typically measured in the far field (typically considered to be at a distance at least 5-10 times the exit aperture size of the lamp, or typically about one-half meter or further away from the lamp). The following definitions are respective to a beam pattern that is peaked near the center of the beam, on the optical axis of the lamp, with generally reduced intensity moving outward from the optical axis to the edge of the beam and beyond. The first performance characteristic is the maximum beam intensity that is referred to as maximum beam candlepower (MBCP), or since the MBCP is usually found at or near the optical axis, it may also be referred to as center-beam candlepower (CBCP). It measures the perceived brightness of the light at the maximum, or at the center, of the beam pattern. The second is the beam width represented by the full width at half maximum (FWHM), which is the angular width of the beam at an intensity equal to one-half of the maximum intensity in the beam (the MBCP). Related to FWHM is the beam lumens, defined as the integral of the lumens from the center of the beam, outward to the intensity contour having one-half of the maximum intensity, that is, the lumens integrated out to the FWHM of the beam. Further, if the integration of lumens continues outward in the beam to the intensity contour having 10% of the maximum intensity, the integrated lumens may be referred to as the field lumens of the lamp. Finally, if all of the lumens in the beam pattern are integrated, the result is referred to as the face lumens of the lamp, that is, all of the light emanating from the face of the beam-producing lamp. The face lumens are typically about the same as the total lumens, as measured in an integrating sphere, since typically little or no is emitted from the lamp other than through the output aperture, or face, of the lamp.

In general, it is desirable to maximize the face lumens (total lumens) of the light in the beam, for a given electrical input to the lamp. The ratio of total face lumens (integrating sphere measurement) to electrical input power to the lamp is the efficacy, in lumens per watt (LPW). To maximize the efficacy of the lamp, it is known (see Non-Imaging Optics, by Roland Winston, et. al., Elsevier Academic Press, 2005, page 11) that the optical parameter known as etendue (also called the "extent" or the "acceptance" or the "Lagrange invariant" or the "optical invariant") should be matched between the light source (such as the filament in the case of an incandescent lamp, or the arc in the case of an arc lamp, or the LED device in the case of an LED-based lamp, or so forth) and the output aperture of the lamp (typically the lens or cover glass attached to the open face of a reflector, or the output face of a refractive, reflective or diffractive beam forming optic). The etendue (E) is defined approximately as the product of the surface area (A) of the aperture through which the light passes (normal to its direction of propagation) times the solid angle ($\Omega$) through which the light propagates, E=A$\Omega$. Etendue quantifies how "spread out" the light is in area and angle.

In the case of the output face of a directional reflector lamp, the exit aperture can be approximated by a circular disc having uniform luminance through it, and the etendue is approximated by $E=A_o \Omega_o$, where $A_o$ is the area of the disc ($\pi R_o^2$, where $R_o$=radius) and $\Omega_o$ is typically a small fraction of $2\pi$ steradians, characterized by the half-angle of the beam of light, $\theta_o$=FWHM/2=HWHM (half width at half maximum), where $\Omega_o=2\pi(1-\cos(\theta_o))$, e.g., for $\theta_o$=90°, $\Omega_o$=2$\pi$; for $\theta_o$=60°, $\Omega_o$=$\pi$; for $\theta_o$=30°, $\Omega_o$=0.84; for $\theta_o$=10°, $\Omega_o$=0.10.

As light propagates through any given optical system, the etendue may only increase or remain constant, hence the term "optical invariant". In a loss-free and scatter-free optical system, the etendue will remain constant, but in any real optical system exhibiting scattering or diffusion of the light, the etendue typical grows larger as the light propagates through the system. E=A$\Omega$ cannot be made smaller as light propagates through an optical system, which means that in order to reduce the solid angle of the light distribution, the aperture through which the light passes must be increased. Accordingly, the minimum beam angle emitted from a directional lamp having an output aperture, $A_o$, is given by $E_o=A_o\Omega_o=A_s\Omega_s=E_s$. Re-arranging, and substituting $\Omega_o=2\pi(1-\cos(\theta_o))$, yields $$\cos(\theta_o) = 1 - \frac{E_s}{2\pi A_o}.$$

For $\theta_o$<<1 radian (that is, for $\theta_o$<<57°), the cosine function can be approximated by $\cos(\theta_o) \cong 1-\theta^2$, where $\theta$ is expressed in radians. Combining the above expressions yields the following output beam half-angle $\theta_o$:

$$\theta_o \cong \sqrt{\frac{\Omega_s A_s}{2\pi A_o}} = \sqrt{\frac{E_s}{2\pi A_o}}. \quad (1)$$

Doubling the half-angle $\theta_o$ of Equation (1) yields the beam FWHM.

In the case of a PAR38 lamp having a circular output aperture, for example, the area of the maximum optical aperture at the face of the lamp is determined by the diameter of the lamp face=4.75"=12 cm, so the maximum allowable $A_o$ is 114 cm². In practice the narrowest beams available in PAR38 lamps typically have FWHM ~6-10°. If the available aperture (i.e. the lens or cover glass) at the face of the lamp is made smaller, then the beam angle will be larger in proportion to the reduction in diameter of the face aperture as per Equation (1).

In the case of a lamp with a circular face aperture of diameter $D_o$ and a light source that is a flat disc of diameter $D_s$, the output half-angle $\theta_o$ of the beam is given by Equation (1) according to:

$$\theta_o \cong \sqrt{\frac{E_s}{2\pi A_o}} = \sqrt{\frac{\Omega_s A_s}{2\pi A_o}} \quad (2)$$

$$= \frac{D_s}{D_o}\sqrt{\frac{\Omega_s}{2\pi}} = \frac{D_s}{D_o}\sqrt{\frac{2\pi(1-\cos(\theta_s))}{2\pi}} = \frac{D_s}{D_o}\sqrt{1-\cos\theta_s}$$

$$\cong \frac{D_s}{D_o}\theta_s.$$

In practice, an LED device comprising a single LED chip typically having a square light-emitting area with linear dimension ~0.5-2.0 mm ($A_s$~0.25-4.0 mm²), an optional encapsulation providing a roughly Lambertian intensity distribution ($\Omega_s$~$\pi$), and optional wavelength-converting phosphor, typically have small etendues of about 1-10 mm²-sr, so that a narrow beam can be produced by providing a small, separate beam-forming optic for each LED device.

If additional light is required, then additional LED devices, each with a separate optic (for example, in a Package-on-Board or PoB configuration), may be added, or multiple LED dies may be encapsulated by a single optic (Chip-on-Board or CoB configuration). A PoB configuration may have advantages in terms of thermal management of the LED junction temperature, and are readily commercially available, whereas CoB configurations are presently less widely available, and are limited to certain chip counts, and spatial dimensions, thus limiting the flexibility of applications. However, in the case of a PoB configuration, the light emitting area spans the plurality of LED devices, and so is considerably larger than a comparable CoB configuration providing a comparable lumen output. Practical considerations such as providing for optical extraction of light from the die (typically using a hemispherical dome having diameter~2× the diagonal length of the die), electrical power conduits, chip mounting structures, providing for heat sinking, and so forth dictate that the center-to-center spacing between LED devices in a PoB configuration (e.g. typically ~4-10 usually substantially greater than the size of an individual die (e.g. ~0.5-1.5 mm), for example by at least a factor of 3 in some cases, and sometimes by a factor of ten or more. As a consequence, the etendue of a two-dimensional array of N LED devices (where N is a positive integer greater than 1) where the array is used as a composite source for a larger optical system, and in which each LED device has a lit area $A_{LED}$ which is not simply $N \times A_{LED}$, but rather may be at least 3 times 3 times, or as much as ten times ten times this value or greater, e.g. ~10-100×N×$A_{LED}$. The etendue, which scales with the light emitting area, thus also increases by a factor of, e.g., ~10-100. Compounding the difficulty is that the total light output of the N LED devices scales only linearly with N, that is, N LED devices puts out N times the light of a single LED device. Still further, the total light output is not distributed evenly, but rather is concentrated at each individual LED device, thus producing an "N-point" light source.

To blend the light output of multiple LED devices into a single light beam, a light-mixing LED light engine may be employed so as to "mix" the light and reduce the highly nonuniform "N-point" emission pattern. A light-mixing LED light engine typically includes a plurality of LED devices disposed in a light-mixing cavity. By making the light-mixing cavity large and highly reflective, and spacing the LED devices apart within the light-mixing cavity, the light can be made to undergo multiple reflections so as to mix the light from the spaced apart LED devices.

Ideal etendue matching ensures that all light from the light engine contributes to the full extent of the beam. However, even ideal etendue matching does not ensure that the desired beam shape can be achieved.

Figure 2:
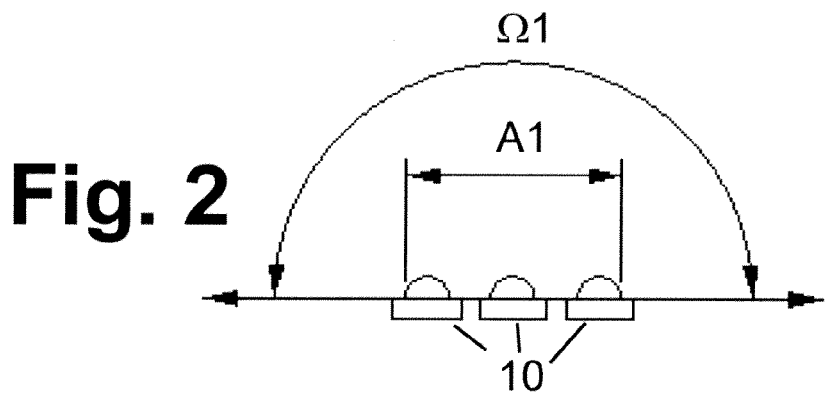
FIGS. 2 and 3 show diagrammatic side views of a engine without reflector cups (FIG. 2) and with reflector cups (FIG. 3).
Figure 3:
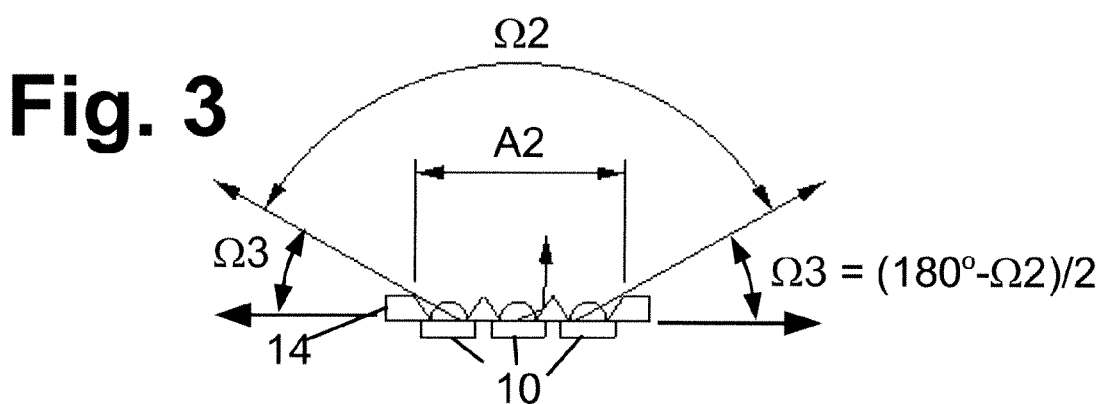

With reference to FIGS. 1-3, an illustrative light engine is shown. FIG. 1 shows a light engine (or light source) which includes a closely packed array of light emitting diode (LED) devices 10 (namely nine LED devices 10 in a close-packed configuration in the case of FIGS. 1-3) with each LED device 10 mounted in its own individual reflector cup 12. In the embodiment of FIGS. 1 and 3, the reflector cups 12 are defined in a reflector plate 14. FIG. 2 shows the light source including the LED devices 10 but without the reflector cups. In this case, the light source has a circular emission area of diameter A1 which is the diameter of the smallest circle that encloses the closely packed array of light emitting diode (LED) devices 10 and a solid angle $\Omega 1$ of light emission. In the absence of the reflector cups, the solid angle $\Omega 1$ is close to a full $\pi$ steradians (corresponding to a nearly Lambertian intensity distribution having a 120° FWHM for a symmetric "slice" through the light intensity distribution). As seen in FIG. 3, the effect of the reflector cups 12 is to reduce the emission solid angle to a smaller solid angle $\Omega 2$, at the slight expense of a slightly increased emission area of slightly increased diameter A2 which is the diameter of the smallest circle that encloses the closely packed array of reflector cups 12 which is increased compared with diameter A1 of FIG. 1 by an amount corresponding to a fraction of the lateral extent of a single one of the reflector cups 12. The reduced solid angle $\Omega 2$ is a consequence of the reflector cups 12 "cutting off" light emission at the large angle range $\Omega 3$, which corresponds to an angle $2\pi$-"$\Omega 2$".

One effect of the reflector cups 12 can be to reduce the etendue to an amount $E_{cups}$ A2$\Omega 2$<A1$\Omega 1$, since the slight increase in the product E=A$\Omega$ due to the slightly larger area A2 can be more than offset by the smaller solid angle $\Omega 2$. For example, in an LED device array having a diameter of 15 mm and $\pi$ steradians, the etendue E=($\pi$*(7.5)$^2$)*$\pi$=555 mm*sr.

For reflector cups having diameter 18 mm and a maximum exit angle of 30 degrees (corresponding to 7 mm deep cups), the etendue decreases by about 36%, i.e. to etendue E=($\pi$*(9)$^2$)*$\pi$*Sin(30°)$^2$=200 mm*sr.

There are substantial practical advantages to making the reflector cups 12 shallow. These advantages include reduced optical losses if the reflectivity of the reflector cups 12 is relatively low (e.g., ~85% reflectivity or lower for many commercially practical reflectors such as aluminized reflectors), a reduced increase in the diameter A2 (as compared with diameter A1 of FIG. 2), and the ability to achieve close packing of the LED devices 10 (in contrast, deeper reflector cups present a larger projected area in the plane of the array of LEDs 10, which in turn requires larger spacing between neighboring LED devices and also the potential for multiple reflections which reduce light output efficiency). Regarding the latter benefit, it is useful to make the reflector cups 12 as close together as practicable; toward this end, neighboring reflector cups may have a scalloped junction 16 as illustrated. However, shallow cups have much lower or even negative impact on etendue. For example, in an LED device array having a diameter of 15 mm and $\pi$ steradians, the etendue E=($\pi$*(7.5)$^2$)*$\pi$=555 mm*sr. For reflector cups having diameter 18 mm and a maximum exit angle of 64 degrees (corresponding to 2 mm deep cups), the etendue actually increases by 16%, i.e. to etendue E=($\pi$*(9)$^2$)*$\pi$*Sin(64°)$^2$=645 mm*sr.

Typical LED devices output generally forward-directed illumination, for example having a Lambertian distribution in some cases. Accordingly, the skilled artisan would not expect to observe a substantial improvement in beam angle when such a light source is used in conjunction with a narrow beam directional lamp since the shallow cups interact only with the side-emitted light and since the etendue of shallow cups can have a small or even negative impact on etendue. When reflector cups are utilized in directional lamps at all, they are typically used in conjunction with wide-beam lamps such as flood lamps, either as standalone optics or in combination with a Fresnel lens and spreading lens for wide beam distributions such as PAR 36 and traffic signal lamps. In these cases, the reflector cups are expected to tailor the beam angle and provide an incremental improvement in efficiency of light transfer to the Fresnel lens.

Figure 4:
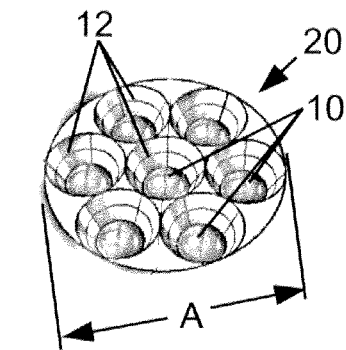
FIGS. 4 and 5 show a light engine including seven LED devices and seven individual respective reflector cups.
Figure 5:
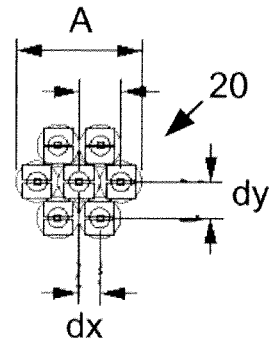

With reference to FIGS. 4-8, however, the present inventors have surprisingly found that a combination of (1) a light engine (or light source) employing reflector cups with little or no light mixing and (2) directional lamp optics including a collecting reflector and an exit aperture lens provides substantial improvement in beam angle and beam intensity as compared with an otherwise identical system that omits the reflector cups. FIGS. 4 and 5 show a light engine 20 including seven LED devices 10 and seven individual respective reflector cups 12. The light engine 20 of FIGS. 4 and 5 differ from that of FIGS. 1 and 3 only in that there are seven LED devices (and a corresponding seven reflector cups 12) instead of nine LED devices. FIG. 5 illustrates notation used to specify spacing of LED devices in the x direction (dx) and in the y-direction (dy). The generic label A is used to indicate the diameter of the light engine 20, which also corresponds to the diameter of the entrance aperture A of the directional lamp optics shown in FIG. 6.

Figure 6:
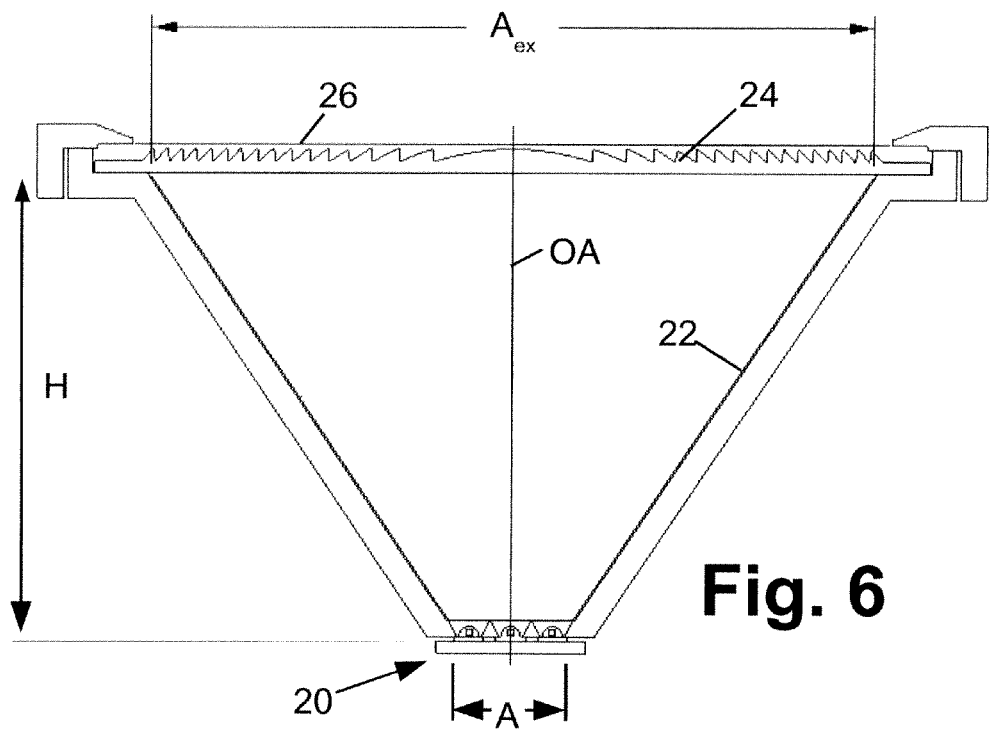
FIG. 6 shows a diagrammatic side sectional view of directional lamp optics including a collecting reflector, an imaging lens, and a diffuser, coupled with the light engine of FIGS. 4 and 5.

With reference to FIG. 6, illustrative directional lamp optics include a collecting reflector 22 having a height H (which could also be considered a length along the optical axis OA). In FIG. 6 the collecting reflector is a conical reflector 22. The directional lamp optics further include an imaging lens 24 located at about the exit aperture of the directional lamp optics. In FIG. 6 the imaging lens is a Fresnel lens 24.

The imaging lens 24 is positioned with the light source 20 at the focal length (f) away from the imaging lens 24, so that the imaging lens 24 "images" the light source 20 at about infinity. If softening of the beam edge is desired, the light source 20 may be located slightly away from the precise focus of the lens 24, in order to provide some defocusing to soften the beam edge. A defocused arrangement to provide softening of the beam edge is still considered to be imaged at about infinity as that term is used herein. Additionally or alternatively, a diffuser 26 may be provided just before or just after (as illustrated) the imaging lens 26 in order to provide softening of the beam edge. In general, the collecting reflector 22 can be conical (as illustrated), or parabolic, or compound parabolic, or so forth. In general, the imaging lens 24 can be a Fresnel lens (as shown), or a convex lens, or a plano-convex lens, or so forth. Further, the imaging lens is optionally optimized away from a perfect imaging lens to achieve the best performance (for example maximum CBCP) as is sometimes done in non-imaging optical systems. The term "imaging lens" is to be understood as encompassing such non-imaging performance optimization. The exit aperture has a diameter $A_{ex}$, which in the embodiment of FIG. 6 is fully spanned by the imaging lens 24 located at the exit aperture. The collecting reflector 22 is preferably highly reflective, and in some embodiments has reflectivity of 98% or higher. In some embodiments, the collecting reflector 22 employs a Miro® anodized aluminum reflective surface (available from Alanod Aluminum-Veredlung GmbH & Co. KG, Germany), although other highly reflective surfaces are also suitable.

It will be noted that the light engine 20 does not include a light mixing chamber or a light mixing diffuser. Rather, the output of the light engine 20 emanates directly from the entrance aperture of the collecting reflector 22. As already noted, the reflector cups 12 of the light engine 20 are generally relatively shallow so as to intersect only the side-emitted light emanating from the generally forward-emitting (e.g., Lambertian) LED device. The illustrative reflector cups 12 are symmetric, by which it is meant that the reflector cups do not bias the beam away from the optical axis OA. However, it is also contemplated to employ asymmetric reflector cups in some embodiments. Also noted was that the Etendue of the system is typically reduced by a small amount, or actually may be increased, by the addition of the reflector cups 12. In view of this, the skilled artisan would not expect the reflector cups 12 to have a significant effect on the beam intensity or the beam angle.

Figure 7:
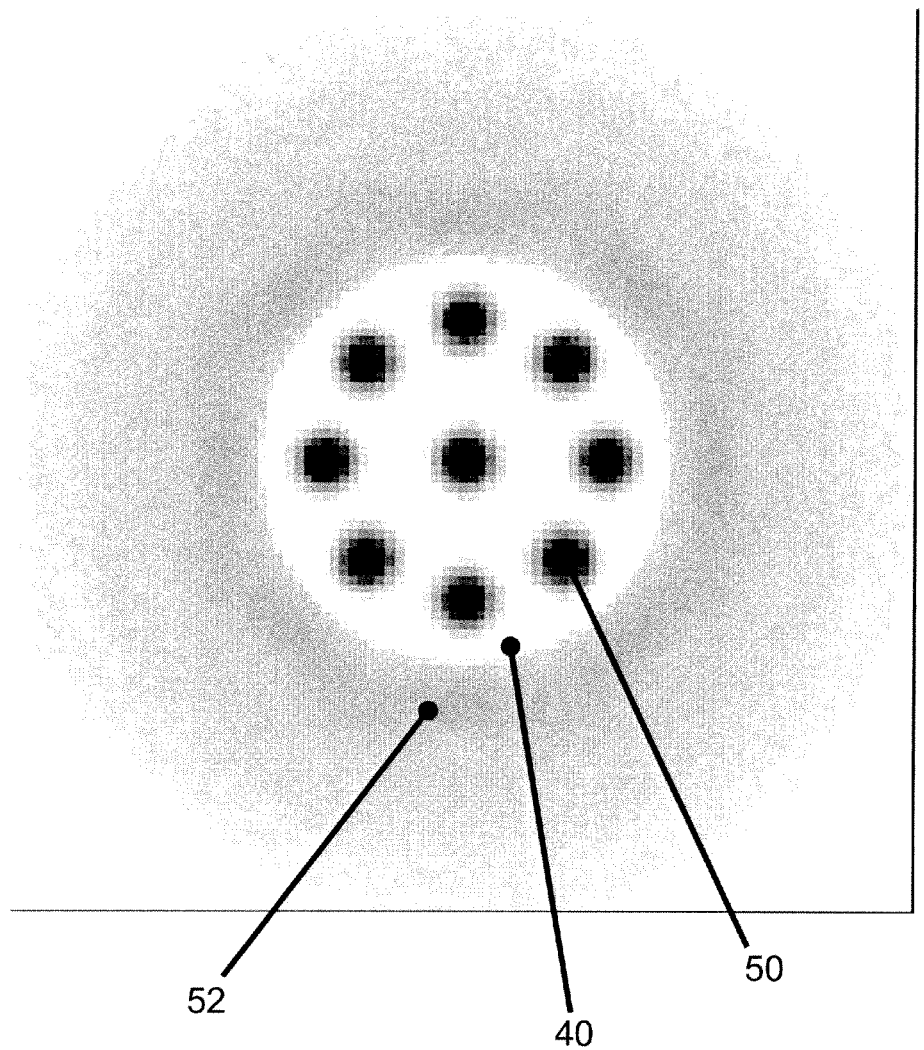
FIGS. 7 and 8 show flux distribution of rays traced through the optics behind the imaging lens 24 and then moved back to the imaging plane of the Fresnel lens, without the reflector cups (FIG. 7) and with the reflector cups (FIG. 8)
Figure 8:
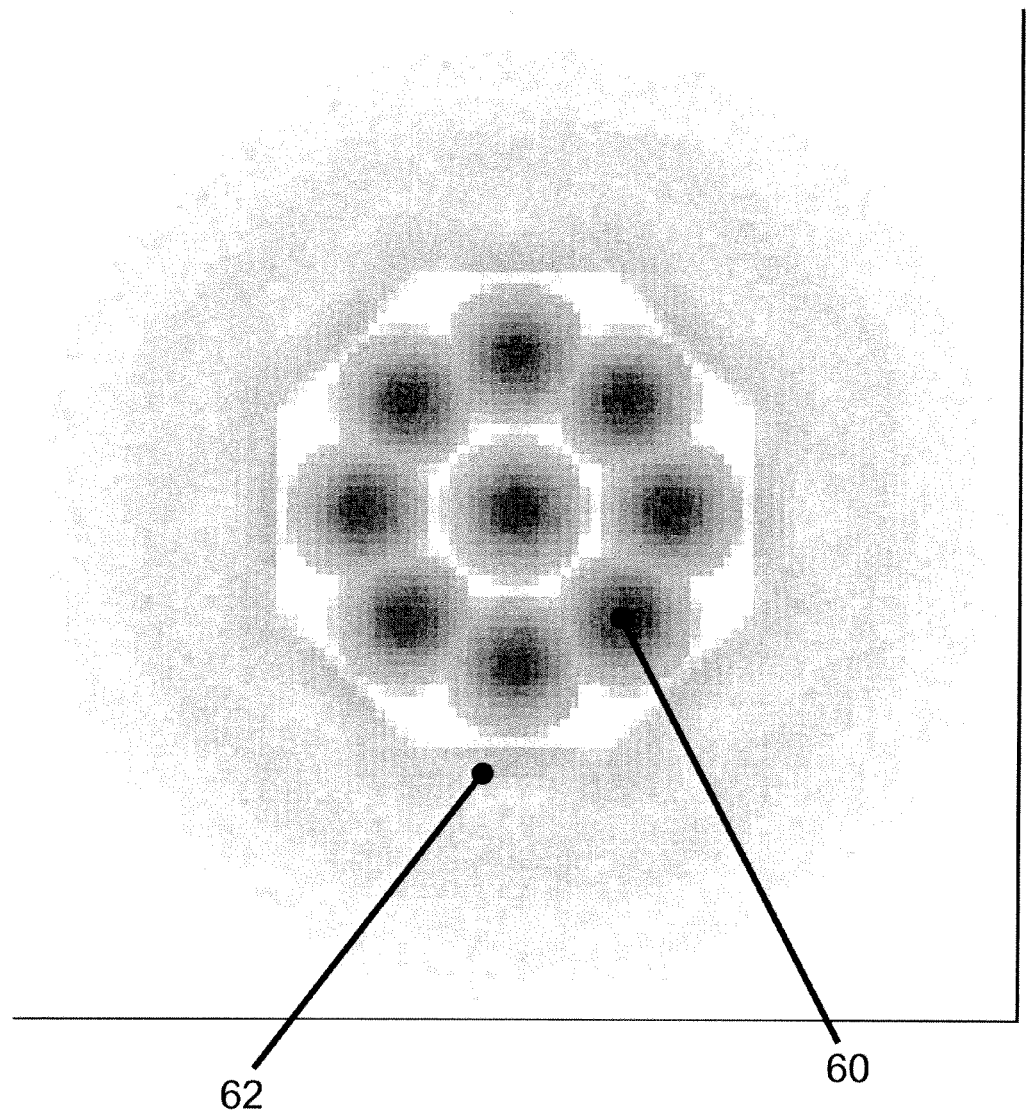

With reference to FIGS. 7 and 8, however, the observed improvement in beam angle due to the shallow reflector cups 12 is actually quite substantial. FIGS. 7 and 8 pertain to a directional lamp employing directional lamp optics of the configuration of FIG. 6, in which height H=57 mm; exit aperture diameter $A_{ex}$=86 mm; and entrance aperture diameter A=15 mm. FIGS. 7 and 8 show the flux distribution of rays traced through all the optics behind the imaging lens 24 and then moved back to the imaging plane of the Fresnel lens (that is, moved back to the plane of the light source 20 which is located at the focal plane of the imaging lens 24, neglecting any defocusing). The imaging lens 24 refracts light rays into an angular distribution that is somewhat proportional to the flux distribution at the image plane. It should be noted that the simulations of FIGS. 7 and 8 employ the nine LED device light engine of FIGS. 1 and 3 (rather than the seven LED device light engine of FIGS. 4-5). FIGS. 7 and 8 employ a gray scale intensity coding in which the highest light intensity is coded as black and the lowest light intensity is coded as white.

FIG. 7 shows the flux distribution in the absence of the reflector cups. Several features are observed. First, the illumination area tilling is poor for the light emission area as seen at the Fresnel lens. There is a "dead space" region 40 in the illumination area between the bright points 50 corresponding to the nine LED devices. Additionally, there is a bright ring 52 surrounding the illumination area, which corresponds to high light intensity in angle Ω3 which will fall outside the FWHM. This bright ring 52 is octagonal in the illustrative embodiment due to the octagonal arrangement of the eight LED devices surrounding a central LED device. In the optical system described, the distribution shown in FIG. 7 produces a beam with a FWHM of approximately 23 degrees after projecting through the Fresnel lens 24 and then the diffuser 26.

FIG. 8 shows the light pattern viewed at the Fresnel lens 24 when the reflector cups 12 are included. The contrast with FIG. 7 is surprisingly stark. The illumination area 60 is now uniformly illuminated, with almost no "dead space" between the bright areas corresponding to the LED devices. Moreover, the ring 62 surrounding the illumination area in FIG. 7 is greatly reduced in intensity in FIG. 8. This low intensity in the ring 62 corresponds to low light intensity in angle Ω3 falling outside the FWHM. This shift of luminance toward the center results in a decrease of FWHM to approximately 16 degrees after projecting through the Fresnel lens and then the diffuser.

Figure 9C:
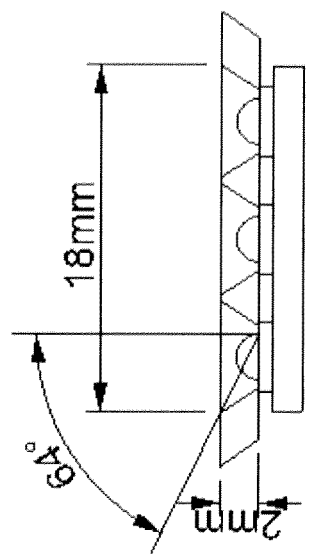
FIGS. 9A, 9B, and 9C show side sectional views for light engines having no reflector cups (FIG. 9A), having deep reflector cups (FIG. 9B), and having shallow reflector cups (FIG. 9C).
Figure 9B:
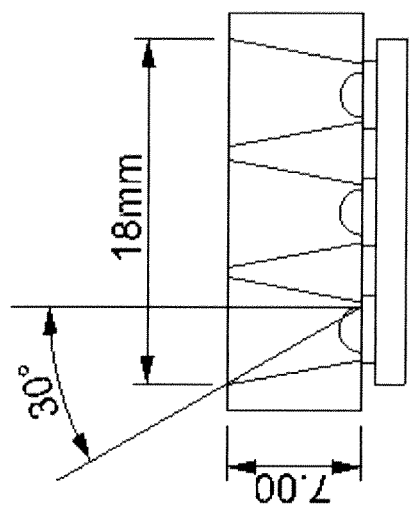
Figure 9A:
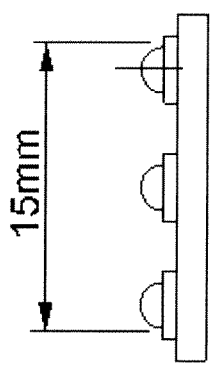

With reference to FIGS. 9A, 9B, and 9C, and without being limited to any particular theory of operation, it is believed that the surprisingly large improvement in beam intensity and beam angle provided by the reflector cups 12 can be understood as follows. FIGS. 9A, 9B, and 9C show, respectively, illustrative light engine geometries for a light engine having no reflector cups (FIG. 9A), having deep reflector cups (FIG. 9B, where the cups are sufficiently deep that no light emitted by the LED devices at an angle of greater than 30° to the optical axis of the light engine fails to impinge on the reflector cups), and having shallow reflector cups (FIG. 9C, where the cups depth is such that no light emitted by the LED devices at an angle of greater than 64° to the optical axis of the light engine fails to impinge on the reflector cups).

Figure 10:
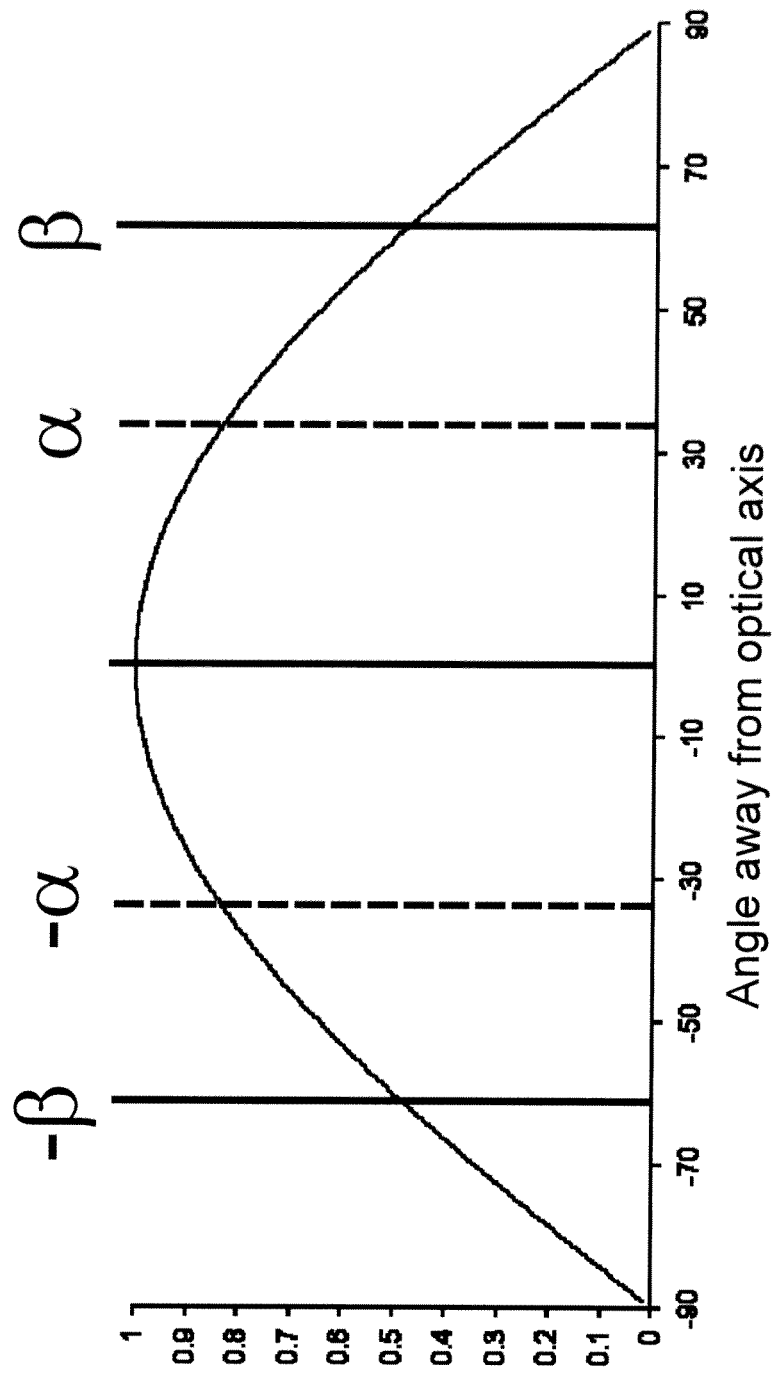
FIG. 10 shows a Lambertian distribution output in relative intensity from a set of nine Lambertian LED devices arranged as per FIGS. 1 and 9A.
Figure 11:
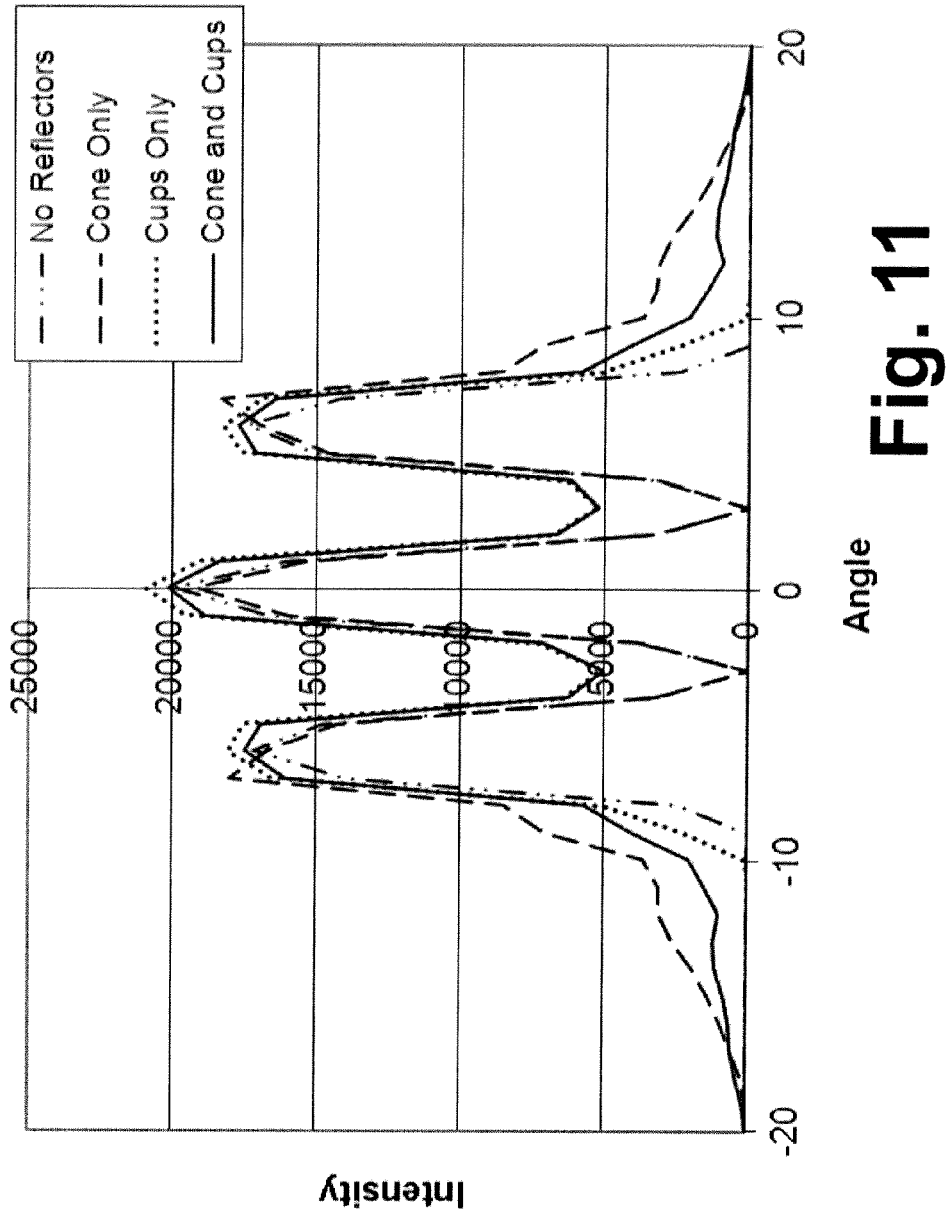
FIG. 11 shows the intensity distribution as projected by the imaging lens without any diffuser and without optimization of the imaging lens.

With reference to FIGS. 10 and 11, the LED devices are assumed to individually emit in a Lambertian pattern. FIG. 1( )shows the Lambertian distribution output in relative intensity from a set of nine Lambertian LED devices. The light within +/−α is directly hitting the imaging lens. FIG. 11 shows the intensity distribution as projected by the lens 24 (see FIG. 6). The curve labeled "No Reflectors" is the simulated result for the nine LED devices without any reflector cups. The intensity distribution includes three intensity peaks corresponding to the LED devices, with dead space between these intensity peaks. The intensity drops to about zero in the dead spaces between the intensity peaks. In FIG. 11, the diffuser 26 (see FIG. 6) is omitted.

Figure 12:
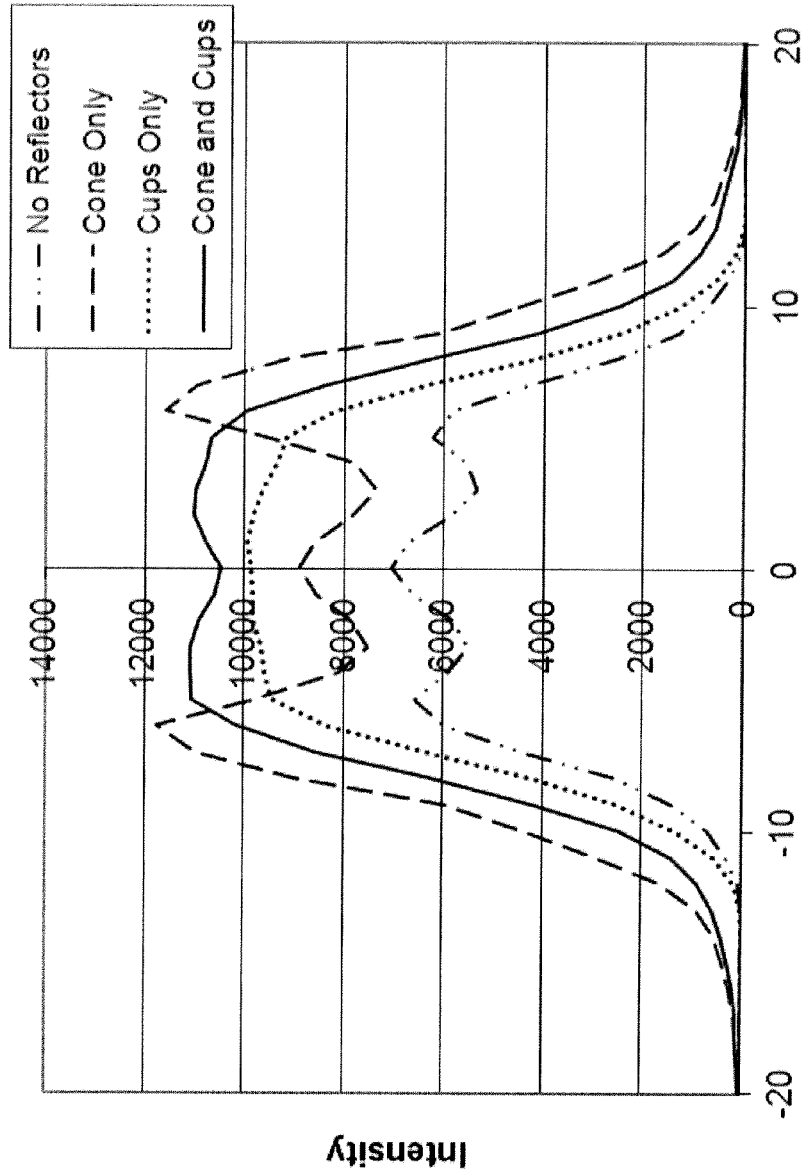
FIG. 12 shows the intensity distribution as projected by the imaging lens without any diffuser but with optimization of the imaging lens.
Figure 13:
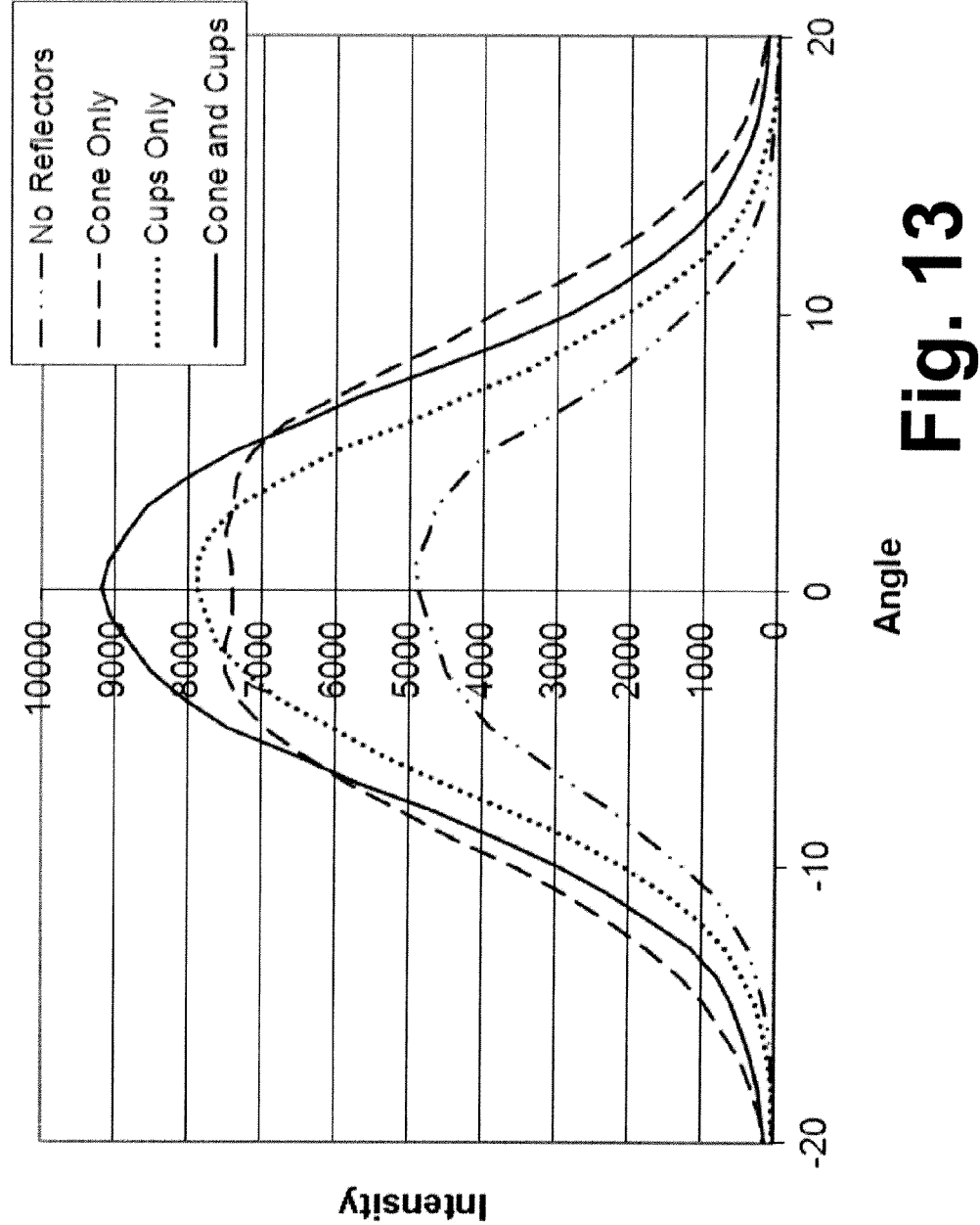
FIG. 13 shows the intensity distribution as projected by the imaging lens with a diffuser and with optimization of the imaging lens.

With reference to FIGS. 12 and 13, the effects seen in FIG. 11 can be reduced by adding beam shaping or diffusion. FIG. 12 shows the effect of optimizing the imaging lens to provide some beam shaping, and in particular to reduce the depth of the intensity drops between the three intensity peaks. There again is no diffuser in the simulations of FIG. 12. FIG. 13 employs the optimized imaging lens of FIG. 12 additionally includes a diffuser (for example, the diffuser 26 of FIG. 6). As seen in FIG. 13, the light emitting from within the 15 mm diameter LED area gets projected into an angular distribution of approximately +/−10 degrees.

With continuing reference to FIGS. 11-14, the curve labeled "Cone only" shows the result when the collecting reflector 22 is added (but with the reflector cups still omitted). The addition of the collecting reflector 22 has the following impact. In FIG. 11, all the light that is outside of +/−α gets reflected to the imaging lens 24 by the collecting reflector 22. This light creates a virtual image of the source as shown by the bright outer ring 52 in FIG. 7 and as indicated in the left side of FIG. 14 (where the dashed rays correspond to the combination of the light engine, imaging lens 24 and collecting reflector 22, but without the reflector cups. This bright outer ring 52 is a virtual image of light retained by the collecting reflector 22. As seen in FIG. 11, none of this light reflected by the collecting reflector 22 is projected to the center (+/−10 degrees) but rather is projected between 10 and 20 degrees from the axis. FIGS. 12 and 13 show the effect of beam shaping or diffusion is merely to create a still-wider beam.

Figure 14:
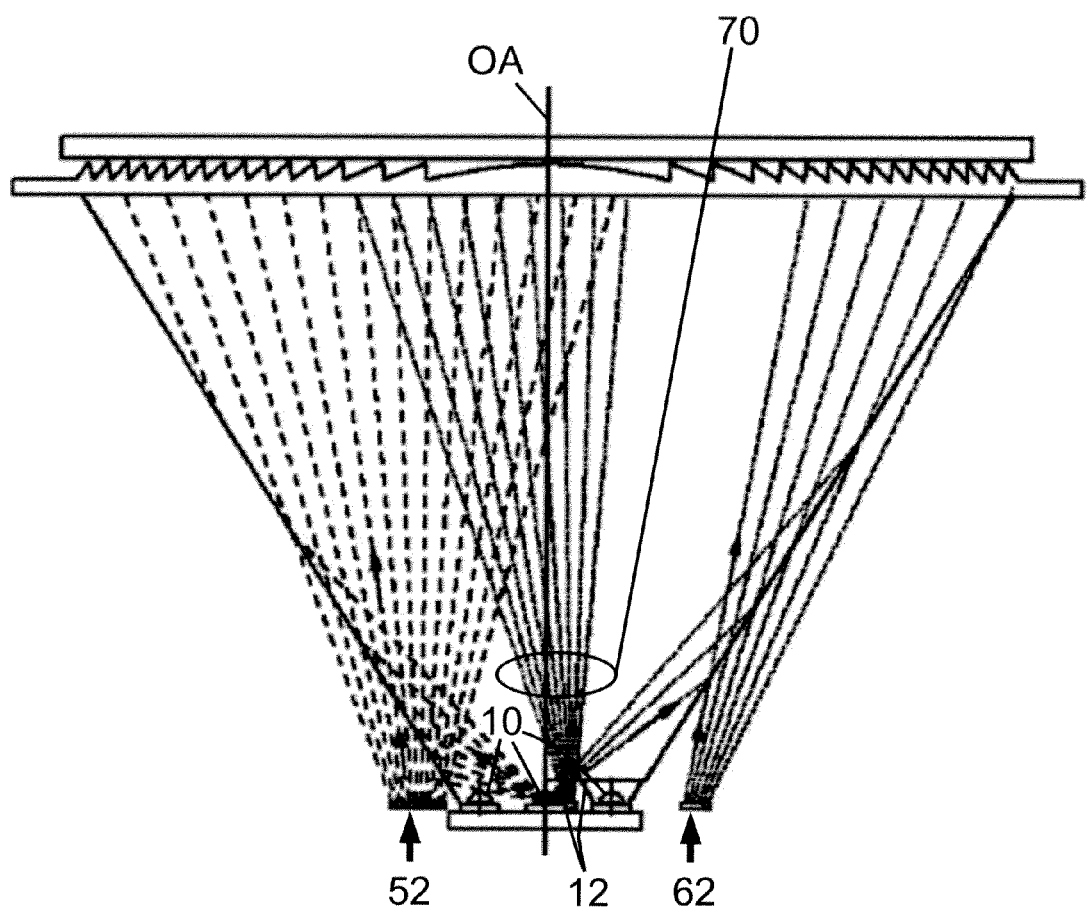
FIG. 14 shows ray tracing diagrams for: (1) a directional lamp including the combination of the light engine, imaging lens and collecting reflector, but without the reflector cups (dashed lines, only left hand side rays are plotted); and (2) a directional lamp including the combination of the light engine, imaging lens, collecting reflector, and further including the reflector cups (solid lines, only right hand side rays are plotted).

With continuing reference to FIGS. 11-14, the curve labeled "Cups only" shows the result when the collecting reflector 22 is omitted but the symmetric reflector cups 12 are added. The curve labeled "Cone and Cups" shows the result when both the collecting reflector 22 and the symmetric reflector cups 12 are added. The addition of the symmetric reflector cups 12 has the following impact. Light outside of +/−β in FIG. 10 is redirected by the reflector cups 12 to the imaging lens 24. (Note that since the illustrative reflector cups 12 are symmetric, it follows that the magnitude or absolute value of the angle |−β| is equal to the magnitude or absolute value of the angle |+β|. In embodiments in which the reflector cups are not symmetric, the magnitude or absolute value |−β| may not be equal to the magnitude or absolute value |+β| and the analysis depends upon direction respective to the asymmetry of the reflector cups.) As shown in FIG. 11 and FIG. 14 where the solid rays correspond to the combination of the light engine, imaging lens 24, collecting reflector 22, and further including the reflector cups, the virtual source created by the reflector cups 12 lies inside the image of the light engine, and fills in the dead space around the intensity peaks generated by the direct illumination of the LED devices. The "Cone and Cups" curve shows that there is much more light projected in between the LED devices and less light between 10-20 degrees from optical axis. With beam shaping by the optimized lens (FIG. 12) and the diffuser (FIG. 13), the result is a beam with a much higher CBCP and smaller FWHM.

Continuing consideration of FIGS. 10-14, light between the angles denoted α and β is reflected by the collecting reflector 22, and contributes to high efficiency. This virtual image of light retained by the collecting reflector 22 corresponds to the ring 62 of low intensity seen in FIG. 8. A light portion 70 (see FIG. 14) corresponding to light at angles (respective to the optical axis OA) that are greater than the angle denoted by the line β in FIG. 10 is collected by the reflecting cups 12, but typically less efficiently due to the lower reflectivity of the reflecting cups 12 compared with the collecting reflector 22. This light 70 is an extra intensity contribution to the beam due to the reflector cups 12. The angle corresponding to line β in FIG. 10 is a selectable design parameter: If this angle β is increased (by making the reflector cups 12 more shallow), efficiency becomes higher but the beam becomes wider. Conversely, if the angle β is decreased (by making the reflector cups 12 deeper), efficiency becomes lower, but the beam becomes more narrow and CBCP increases. For a spot beam application in which the beam FWHM is of order 20° or smaller, the angle β can be relatively large (corresponding to shallow reflector cups). For example, in some embodiments the reflector cups 12 are chosen to be sufficiently shallow that some light emitted by the LED devices at an angle of greater than 40° to the optical axis of the light engine does not impinge on the reflector cups. In some embodiments more shallow cups are employed, for example the reflector cups 12 are chosen to be sufficiently shallow that some light emitted by the LED devices at an angle of greater than 55° to the optical axis of the light engine does not impinge on the reflector cups.

In general, the portions of the intensity distribution lying outside the acceptance angle [−α, α] of the lens 24 (indicated by dashed lines labeled −α and α in FIG. 10) is lost if the collecting reflector 22 and the reflector cups 12 are omitted. Both beam intensity and face lumens are reduced by the loss of the light outside the range [−α, α].

The addition of the collecting reflector 22 redirects light that would otherwise fall outside of the acceptance angle [−α, α] into the imaging lens 24 (or, equivalently, into the exit aperture $A_{ex}$). This light contributes to the face lumens, and there may also be some contribution to the CBCP if the diffuser 26 and/or an imaging lens optimized for beam shaping is employed. With reference to the lefthand side of FIG. 14, which shows dashed ray traces for the light engine/collecting reflector 22/imaging lens 24 assembly, with the reflector cups 12 omitted, it is seen that for light retained by the collecting reflector 22, the reflected light rays emanate from "virtual points" 52 which are far away from the optical axis OA. In FIG. 7 (showing the flux distribution of rays traced through all the optics behind the imaging lens 24 and then moved back to the imaging plane of the Fresnel lens 24), these "virtual points" form the bright ring 52 surrounding the image of the light engine.

The reflector cups 12 provide materially different performance versus the collecting reflector 22. Light rays at angles outside the angular range [−β, β] impinge on the nearest reflector cup 12 (that is, on the reflector cup in which the generating LED device 10 is disposed) and are redirected to form the light 70 directed generally parallel with the optical axis OA. The "virtual points" from which these light rays 70 emanate lie inside of the area of the light engine, and so contribute substantial light to the central beam, with substantially less light spilling outside the beam (compare the "Cups only" curves of FIGS. 11-13 with the "Cone only" curves).

Some light rays at angles outside the acceptance angle [−α, α] but within the angular range [−β, β] do not impinge on the (generally shallow) reflector cups 12, but also do not fall within the acceptance angle [−α, α] of the imaging lens 24. Thus, these light rays impinge on the collecting reflector 22. These light rays reflected from the collecting reflector 22 emanate from "virtual points" 62 relatively far away from the optical axis OA, and contribute less light to the central beam and more light to areas outside the central beam. The reflector cups 12 substantially reduce the portion of light contributing to the outer illumination ring 62 because a substantial portion of that light is instead placed into the central beam by the reflector cups 12. This explains why the addition of the shallow reflector cups 12 is able to reduce the high intensity outer illumination ring 52 of FIG. 7 to the much lower intensity outer illumination ring 62 seen in FIG. 8.

Moreover, the "virtual points" from which the light 70 redirected by the reflector cups 12 appears to emanate are distributed over a large area of the light engine. This is readily seen in the comparison between the image plane of FIG. 7 and the image plane of FIG. 8 in FIG. 8, the space between the LED device images (the nine bright spots manifest in FIG. 7) is substantially filled in by light 70 reflected by the shallow reflector cups 12. This is also seen in FIG. 11 (comparing the curves for configurations omitting the reflector cups with the curves for configurations including the reflector cups). However, this homogenizing effect is "washed out" to some extent when the optional optimized imaging lens (FIG. 12) and diffuser (FIG. 13) are employed.

The effects of the reflector cups 12 and the collecting reflector 22 on the center beam candlepower (CBCP) and efficiency are summarized in Table 1, which shows the values for a directional lamp including the optimized imaging lens and the diffuser as calculated in a ray-tracing optical model (that is, corresponding to FIG. 13). Comparing the configurations with/without the reflector cups, it is seen that the addition of the reflector cups produces a substantial increase in CBCP, at the cost of some loss in efficiency. The loss in efficiency due to the reflector cups is primarily due to the non-ideal reflectance of the aluminized surface (assumed to be 85% in the model calculations). Most of that loss is recoverable by selecting a coating having higher reflectance for the reflector cups.

TABLE 1

| Directional lamp configuration | CBCP | Efficiency |
|---|---|---|
| No reflector cups and no collecting reflector | 5000 | 32% |
| Collecting reflector but no reflector cups | 7400 | 90% |
| Reflector cups but no collecting reflector | 7900 | 55% |
| Reflector cups and collecting reflector | 9100 | 81% |

In some contemplated embodiments, the collecting reflector 22 is omitted. However, in many applications the light contribution of the collecting reflector 22 (corresponding to the outer illumination ring 62 in FIG. 8), while falling outside of the area of the imaged light source, is still useful. For example, if the optical system is overdesigned such that the imaged light source is narrower than the intended beam FWHM, then the light contribution of the collecting reflector 22 may still fall within the intended beam FWHM. The light outside the central beam provided by the collecting reflector 22 can also generate a soft edge for the central beam.

Moreover, as seen in FIGS. 12 and 13, if beam shaping is provided by an optimized imaging lens, and/or diffusion is provided by the diffuser 26, then the light contribution of the collecting reflector 22 to the central beam intensity can be substantial (albeit at the cost of additional intensity also contributed outside of the beam FWHM).

The angular parameters $\alpha$ and $\beta$ are design parameters that can be adjusted to tailor the spot beam characteristics as desired. The angular parameter $\alpha$ defines the acceptance angle $[-\alpha, \alpha]$ of the imaging lens 24. Typically, the collecting reflector 22 is configured so its exit aperture A, (see FIG. 6) precisely matches the acceptance angle $[-\alpha, \alpha]$ so that the optically active area of the imaging lens 24 fills the exit aperture $A_{ex}$ of the collecting reflector 22. In general, increasing the angle $\alpha$ provides more light in the central beam and hence increases central beam intensity and enables reduction in beam FWHM. However, the angle $\alpha$ is typically constrained by the physical dimensions of the lamp (as defined, for example, by the MR standard, PAR standard, or other lamp standard with which the spot light is to conform) and by the numerical aperture (NA) or f-number of the imaging lens 24. The NA or f-number constraint typically limits the geometry of the lamp of FIG. 6 to one in which the exit aperture $A_{ex}$ is about equal to the height H.

The angular parameter $\beta$ is tunable by the depth (or, equivalently, shallowness) of the reflector cups 12. As the reflector cups 12 are made deeper, the angular range $[-\beta, \beta]$ decreases and the light contribution to the central beam intensity increases. Initially, this might suggest that $\beta$ should be made small (that is, deep reflector cups should be used). However, in practical systems the reflectivity of the reflector cups 12 is sometimes substantially lower (e.g., no more than 90% reflectivity in some embodiments) than the reflectivity of the collecting reflector 22. For example, the collecting reflector 22 can be readily made of a Miro® anodized aluminum reflective surface having reflectivity of 95% or higher. Due to their small size, the reflector cups 12 include small, high-curvature or fine features, and the Miro® material is not readily shaped to accommodate such fine features. The reflector cups 12 are suitably made of evaporated aluminum or evaporated silver, optionally further including an evaporated dielectric coating or other surface treatment. Evaporated aluminum has relatively low reflectivity (e.g., ~85% reflectivity or lower). Evaporated silver can have substantially higher reflectivity, but it has limited robustness against deterioration over time (e.g., silver can tarnish), and is more expensive than aluminum. The precise shape of the reflector cups 12 is not expected to have a substantial effect, and the reflector cups 12 can have a conical geometry (or more precisely, a conical frustum geometry), parabolic (or more precisely parabolic frustum) geometry, compound parabolic concentrator (CPC) geometry, or so forth. Employing conical reflector cups 12 has the advantage of simplified fabrication in some manufacturing settings. In view of the generally reduced reflectivity of the reflector cups 12 as compared with the collecting reflector 22, it is generally desirable to make the reflector cups 12 sufficiently shallow so as to avoid (on average) multiple light ray reflections within the reflector cup.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A directional lamp comprising:
    a light engine comprising a plurality of light emitting diode (LED) devices and a corresponding plurality of reflector cups wherein each LED device is disposed in a corresponding reflector cup, each cup having an LED end and an opposed exit opening end;
    an imaging lens arranged to generate an image of the light engine at about infinity; and
    a collecting reflector defining sidewalls of the directional lamp extending between a periphery of the light engine and a periphery of the optically active area of the imaging lens, the collecting reflector having an entrance aperture at which the light engine is disposed and an exit aperture at which the imaging lens is disposed and said reflector cup exit opening end being disposed relatively closer to said LED devices than said exit aperture;
    wherein some light rays emanating directly from the LED devices reflect off the collecting reflector into the imaging lens and some light rays emanating directly from the LED devices reflect off the reflecting cups into the imaging lens.

2. The directional lamp as set forth in claim 1, wherein the light engine does not include a diffuser.

3. The directional lamp as set forth in claim 1, wherein the directional lamp does not include a light mixing chamber.

4. The directional lamp as set forth in claim 1, wherein the light engine is generally planar.

5. The directional lamp as set forth in claim 1, wherein the collecting reflector is a conical, parabolic, or compound parabolic reflector.

6. The directional lamp as set forth in claim 1, wherein the collecting reflector has a reflectivity of at least 95% and the reflector cups have reflectivity of no more than 90%.

7. The directional lamp as set forth in claim 1, wherein (i) the collecting reflector generates illumination that is outside the image of the light engine imaged at about infinity after exiting the imaging lens and (ii) the reflecting cups generate illumination that is inside the image of the light engine imaged at about infinity after exiting the imaging lens.

8. The directional lamp as set forth in claim 1, further comprising:
  a diffuser disposed with the imaging lens at the exit aperture.

9. The directional lamp as set forth in claim 8, wherein there is no diffuser disposed with the light engine at the entrance aperture.

10. The directional lamp as set forth in claim 1, wherein the imaging lens is arranged to generate a defocused image of the light engine at about infinity to soften the beam edge.

11. A light engine comprising:
  a plurality of light emitting diode (LED) devices arranged in a plane; and
  a corresponding plurality of reflector cups wherein each LED device is disposed in a corresponding reflector cup each cup having an LED end and an opposed exit opening end;
  a collecting reflector extending between a periphery of the light engine and an optically active area of an imaging lens, said imaging lens being spaced from the exit opening end of each reflector cup;
  wherein the light engine does not include either a diffuser or a light mixing cavity; and
  wherein (i) the collecting reflector generates illumination that is outside the image of the light engine imaged at about infinity after exiting the imaging lens and (ii) the reflecting cups generate illumination that is inside the image of the light engine imaged at about infinity after exiting the imaging lens.

12. The light engine as set forth in claim 11, wherein the reflector cups are sufficiently shallow that some light emitted by the LED devices at an angle of greater than 40° to the optical axis of the light engine does not impinge on the reflector cups.

13. The light engine as set forth in claim 11, wherein the reflector cups are sufficiently shallow that some light emitted by the LED devices at an angle of greater than 55° to the optical axis of the light engine does not impinge on the reflector cups.

14. The light engine as set forth in claim 11, wherein an effective light emission area of the light engine is at least 80%, where the effective light emission area of the light engine is defined as the area of the LED devices plus the area of the reflector cups projected onto the plane of the light engine.

15. The light engine as set forth in claim 14, wherein the effective light emission area of the light engine is 100%.

16. A directional lamp comprising:
  a light engine including a plurality of light emitting diode (LED) devices arranged in a plane and a corresponding plurality of reflector cups wherein each LED device is disposed in a corresponding reflector cup and wherein the light engine does not include either a diffuser or a light mixing cavity;
  an imaging lens receiving light from each of the LED devices and arranged to generate an image of the light engine at about infinity; and
  a collectin reflector extendin between a relatively narrower entrance aperture at which the light engine is disposed and a relatively wider exit aperture at which the imaging lens is disposed.

17. The directional lamp as set forth in claim 16, wherein the reflector cups of the light engine are sufficiently shallow that some light rays emanating directly from the LED devices reflects off the collecting reflector into the imaging lens.

18. The directional lamp as set forth in claim 16, wherein some light rays emanating directly from the LED devices reflects off the collecting reflector into the imaging lens and some light rays emanating directly from the LED devices reflects off the reflecting cups into the imaging lens.

19. The directional lamp as set forth in claim 16, wherein the collecting reflector is a conical, parabolic, or compound parabolic reflector.

20. The directional lamp as set forth in claim 16, wherein the collecting reflector has a reflectivity of at least 95% and the reflector cups have reflectivity of no more than 90%.

21. The directional lamp as set forth in claim 16, wherein (i) the collecting reflector generates illumination that is outside the image of the light engine imaged at about infinity by the imaging lens and (ii) the reflecting cups generate illumination that is inside the image of the light engine imaged at about infinity by the imaging lens.

22. The directional lamp as set forth in any one of claims 16, further comprising:
  a diffuser disposed proximate to the imaging lens and distal from the light engine.

23. The directional lamp as set forth in any one of claims 16, wherein the imaging lens is arranged to generate a defocused image of the light engine at about infinity to soften the beam edge.

24. The directional lamp as set forth in claim 16, wherein the imaging lens consists of a light transmissive material.

\* \* \* \* \*